(12) United States Patent
Lee et al.

(10) Patent No.: US 7,557,057 B2
(45) Date of Patent: Jul. 7, 2009

(54) METHOD FOR PREPARATION OF HIGHLY DISPERSED SUPPORTED PLATINUM CATALYST

(75) Inventors: Jong Hyun Lee, Seongnam-si (KR); Young Min Kim, Dongducheon-si (KR); Jong heop Yi, Seoul (KR); Pil Kim, Yeongju-si (KR); Ji Bong Joo, Jinju-si (KR)

(73) Assignee: Hyundai Motor Company, Seoul (KR)

( * ) Notice: Subject to any disclaimer, the term of this patent is extended or adjusted under 35 U.S.C. 154(b) by 357 days.

(21) Appl. No.: 11/499,083

(22) Filed: Aug. 4, 2006

(65) Prior Publication Data

US 2007/0135299 A1 Jun. 14, 2007

(30) Foreign Application Priority Data

Dec. 12, 2005 (KR) .................. 10-2005-0121882

(51) Int. Cl.
 *B01J 31/00* (2006.01)
 *B01J 37/00* (2006.01)
 *B01J 21/18* (2006.01)
 *B01J 23/40* (2006.01)
 *B01J 23/74* (2006.01)
 *C08F 4/02* (2006.01)
 *C08F 4/60* (2006.01)

(52) U.S. Cl. .................. 502/104; 502/171; 502/180; 502/185

(58) Field of Classification Search .................. 502/104, 502/171, 180, 185
See application file for complete search history.

(56) References Cited

U.S. PATENT DOCUMENTS 3,265,526 A * 8/1966 Bernard ...................... 427/229

| 4,186,110 | A | | 1/1980 | Jalan et al. |
| 5,068,161 | A | | 11/1991 | Keck et al. |
| 5,275,999 | A | * | 1/1994 | Tsurumi et al. ............. 502/339 |
| 6,939,640 | B2 | * | 9/2005 | Kourtakis ..................... 429/40 |
| 2004/0197638 | A1 | * | 10/2004 | McElrath et al. ............. 429/44 |

(Continued)

FOREIGN PATENT DOCUMENTS

KR 2004-88288 10/2004

OTHER PUBLICATIONS

PDF files for platinum (II) chloride and platinum (IV) chloride, provided by Wikipedia.org.*

(Continued)

*Primary Examiner*—Patricia L Hailey
(74) *Attorney, Agent, or Firm*—Morgan, Lewis & Bockius LLP

(57) ABSTRACT

The present invention relates to a method for synthesizing highly dispersed supported platinum catalyst. More particularly, the present invention relates to a method of synthesizing highly dispersed supported platinum catalyst comprising: dissolving a reducing agent in a solvent to produce a solution, dissolving a platinum chloride to the same solvent; adding a carbon support and platinum in a predetermined ratio to the above mixed solution, agitating the mixture, performing ultrasonic treatment, and performing heat treatment; and adding a HCl solution, agitating the mixture, separating the precipitates via filtration to produce a catalyst, and then washing the catalyst with distilled water, thereby obtaining an active highly dispersed supported platinum catalyst which has excellent electric charge activity, uniformly-sized platinum particles and relatively high specific surface area.

6 Claims, 3 Drawing Sheets

U.S. PATENT DOCUMENTS

2006/0228603 A1* 10/2006 Daimon et al. ................ 429/30

OTHER PUBLICATIONS

"Optimization of deposition parameters of thin films composed of Pt nanoparticles," H. A. Andreas et al. Electrochimica Acta 51 (2006), pp. 2554-2564.*

"Synthesis and Characterization of Alkoxide-Derived Pt Nanoparticles," H. A. Andreas et al. J. Phys. Chem. B 2005, 109, pp. 3743-3750.*

"Composition, Structure, and Electrochemical Behavior of Sol-Gel Derived Nanoparticulate Pt Thin Films," H. A. Andreas et al. Journal of The Electrochemical Society, 149 (11), pp. A1481-A1488 (2002).*

"Preparation of highly dispersed Pt catalyst using sodium alkoxide as a reducing agent and its application to the methanol elecrro-oxidation," Pil Kim et al. Journal of Molecular Catalysis A: Chemical 263 (2007), pp. 15-19.*

* cited by examiner

METHOD FOR PREPARATION OF HIGHLY DISPERSED SUPPORTED PLATINUM CATALYST

CROSS REFERENCE TO RELATED APPLICATION

This application is based on, and claims priority to Korean Patent Application No. 2005-0121882, filed on Dec. 12, 2005 with the Korean Intellectual Property Office, the disclosure of which is incorporated herein by reference in its entirety.

FIELD OF THE INVENTION

The present invention relates to a method of preparing a catalyst. More specifically, the present invention relates to a method of preparing a high-dispersion platinum catalyst.

BACKGROUND OF THE INVENTION

A fuel cell is a device that converts chemical energy of a fuel into electricity. Fuel cells are attractive for a variety of reasons, e.g. high energy efficiency, low pollution, fuel flexibility, high quality power output, quick response to load fluctuations, excellent heat recovery characteristics, quiet operation, etc. Their high energy efficiency and low pollution are partially attributed to the use of a clean fuel source, e.g. hydrogen, methanol, etc. Fuel cells can be utilized in various contexts, e.g. as power sources for computers, camcorders, mobile phones, automobiles, trains, ships, submarines, heat and electric supply to homes, and electric power plants. Recent efforts have been directed to developing fuel cells as a power source in automobiles and mobile phones.

The structure of a basic fuel cell consists of two electrodes, i.e. an anode and a cathode, and an electrolyte. Oxygen passes over one electrode and hydrogen passes over the other electrode to generate electricity, water, and heat. In a catalyzed reaction, the hydrogen atom splits into a proton and an electron, which travel to the cathode along different paths. The proton passes through the electrolyte while the electrons create a separate current that can be utilized before returning to the cathode to be reunited with the hydrogen and oxygen in a molecule of water.

Fuel cells can be classified according to their operating temperatures, i.e. high-temperature type or low-temperature type, depending on the kind of electrolytes used. For instance, a low-temperature fuel cell has high catalytic activity and ion conductivity at relatively low temperatures for generating a desired amount of energy. As recognized by those of ordinary skill in the art, the catalyst and electrolytes employed in a fuel cell have significant impact in determining the functional specifications of a fuel cell.

Fuel cells that operate at relatively low temperatures, e.g. about 80° C. to about 100° C., generally utilize active catalysts made of a high-dispersion precious metal such as platinum. As such, the development of fuel cells that operate on minimal quantities of catalyst is crucial to achieving high performance and reliability at low cost. While an increase in the surface area of platinum catalyst particles can increase catalytic activity by enhancing the reactive surface area exposed to reactants, there are practical considerations which limit how this increase in surface area may be implemented. In membrane electrode assembly ("MEA"), increased thickness of the catalyst layer increases the internal resistance of MEA, which causes the output of the fuel cell to drop. A thick catalyst layer would slow the rate of gas diffusion which is critical to efficient fuel cell function.

In the face of these difficulties, the development of platinum supported catalysts with a high loading and dense dispersion of platinum particles of minimal size remains an ongoing endeavor. There is still a need in the art to develop catalysts having reduced requirements for platinum or at least optimized activity per unit weight of platinum without suffering a dramatic decrease in its energy efficiency.

Conventional methods for preparing Pt/support powder by loading Pt particles on a support are broadly classified into precipitation methods or colloidal methods. In precipitation methods, the procedure is carried out primarily in liquid state and relatively adaptable for mass production. However, many conventional precipitation methods tend to produce non-uniform dispersion of relatively large platinum particles.

In colloidal methods, fine platinum particles are synthesized in an aqueous solution or an organic solution and then adsorbed onto a carbon support. Colloidal methods require an extra hydrogen reduction step, are generally more time-consuming, and difficult to control with respect to the platinum particle size resulting therefrom. Slight variations in the reaction conditions, e.g. pH or temperature or duration of such conditions, can have tremendous impact on the particle size. For example, in the manufacture of platinum colloids using organic materials such as ethylene glycol, non-uniformly sized platinum colloids will result unless the temperature is increased to the reducing temperature, i.e. about 150° C., within 20 minutes. While it is possible to produce fine platinum colloidal particles at basic pH in an aqueous environment, the process involves more time and/or higher temperature conditions for reduction to occur. As such, there is a need in the art for improved methods for preparing high-dispersion supported platinum catalyst.

SUMMARY OF THE INVENTION

The present invention provides a method for preparing a high-dispersion supported platinum catalyst that is readily reproducible. The platinum catalyst produced from the methods disclosed herein possess properties, e.g. uniform size and distribution, high dispersion, and smaller diameter of platinum particles, high surface area exposed to reactants, that make them ideal for use in fuel cells. The characteristics of the platinum particles thereby produced are also not as susceptible to varying conditions during synthesis, thereby providing greater control over the product.

The method of the present invention comprises:

(a) dissolving sodium alkoxide and platinum chloride in a solvent to produce a solution;

(b) mixing the solution with a carbon support;

(b) subjecting the solution mixed with the carbon support to ultrasonic treatment at about 30-60 Hz;

(c) heating the solution mixed with the carbon support to temperatures ranging from about 5° C.-80° C.;

(d) combining the solution mixed the carbon support with a HCl solution;

(e) optionally, filtering out the precipitates from the solution of step (d) to produce a catalyst; and (f) optionally, washing the catalyst with water, wherein the molar ratio of platinum chloride:sodium alkoxide ranges from about 1:4 to 1:8.

As a result, the inventors have discovered a method for synthesizing highly dispersed supported platinum catalyst with improved electrochemical activity comprising reducing platinum particles in a carbon-containing ethanol solution using sodium alkoxide as a reducing agent and then impregnating fine platinum particles onto a carbon support by treating with a diluted HCl solution.

BRIEF DISCUSSION OF DRAWINGS

Objects, features and advantages of the present invention will be apparent from the following detailed description of the preferred embodiments of the invention in conjunction with the accompanying drawings, in which.

Figure 4:
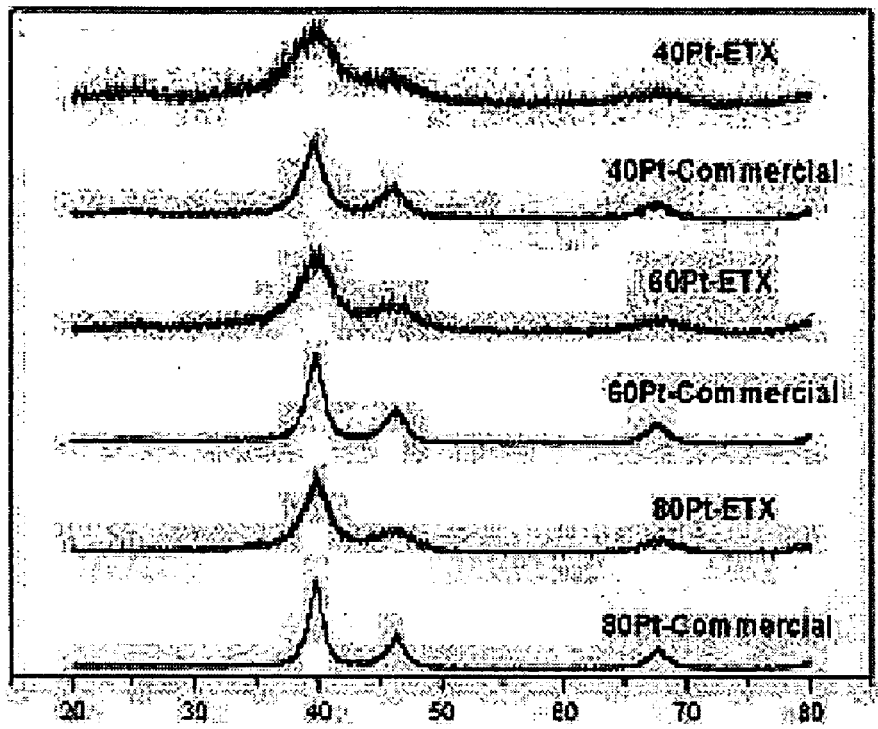
Figure 5:
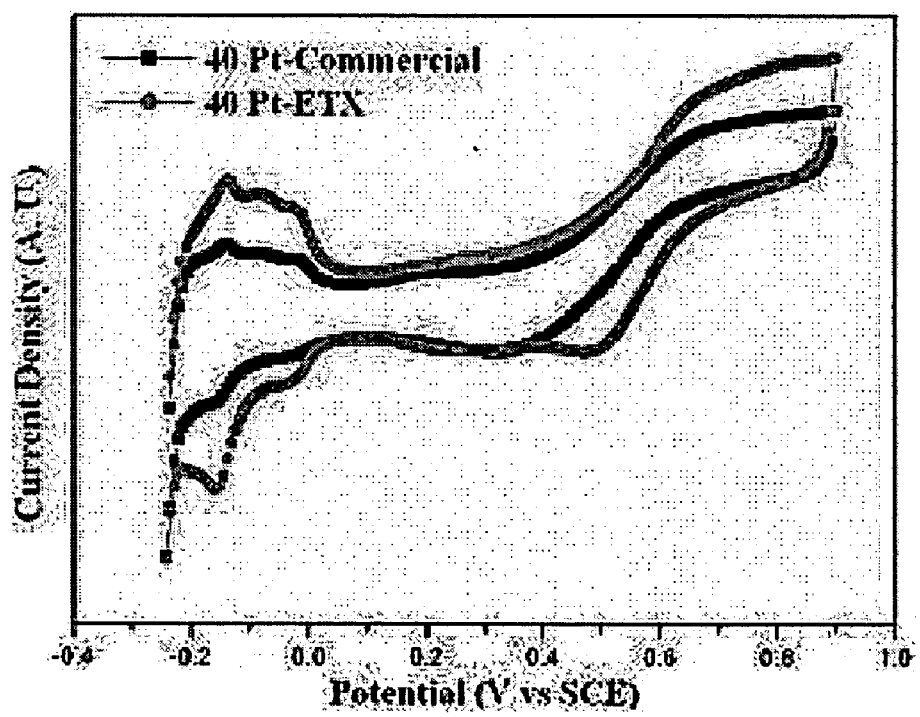

FIG. 4 shows a comparison of various % by weight of Pt-impregnated catalysts (Pt-ETX) synthesized according to the present invention with their corresponding commercial counterparts (Pt-Commercials) based on their x-ray diffraction profiles; and FIG. 5 shows a comparison of various % by weight of Pt-impregnated catalysts synthesized according to the present invention with their corresponding commercial counterparts (Johnson-Matthey) based on cyclic voltammograms.

DESCRIPTION OF THE INVENTION

The present invention relates to a method of synthesizing highly dispersed supported platinum catalyst comprising:

(a) dissolving sodium alkoxide and platinum chloride in a solvent to produce a solution;

(b) mixing the solution with a carbon support;

(b) subjecting the solution mixed with the carbon support to ultrasonic treatment at about 30-60 Hz;

(c) heating the solution mixed with the carbon support to temperatures ranging from about 5° C.-80° C.;

(d) combining the solution mixed the carbon support with a HCl solution;

(e) optionally, filtering out the precipitates from the solution of step (d) to produce a catalyst; and (f) optionally, washing the catalyst with water, wherein the molar ratio of platinum chloride:sodium alkoxide ranges from about 1:4 to 1:8.

In some embodiments of the present invention, there is provided a method for synthesizing highly dispersed supported platinum catalyst with improved electrochemical properties. The method involves reducing platinum particles in a carbon-containing alcohol using sodium alkoxide as a reducing agent and then impregnating fine platinum particles onto a carbon support by treatment with diluted HCl solution.

First, a platinum precursor and a reducing agent are added to a solvent. To facilitate the dissolution of the platinum precursors and reducing agent in the solvent, any mixing or agitational means known in the art can be employed. Preferably, the platinum precursor is selected to be platinum chloride although other platinum precursors known in the art can also be employed to achieve the purpose of the present invention. In preferred embodiments of the invention, the molar ratio of the platinum precursors to reducing agent is about 1:4-1:8. If the molar ratio is less than about 1:4, the platinum precursors cannot be completely reduced. Meanwhile, if the molar ratio of Pt precursors to reducing agent exceeds about 1:8, a significant amount of reducing agent would go to waste, thereby making it economically inefficient. Those of skill in the art will recognize that the dissolving of platinum precursors and reducing agent in the solvent can be performed simultaneously or achieved in multiple steps, wherein platinum precursors are dissolved in the solvent in one step and sodium alkoxide is dissolved in the solvent in another step in any sequence with respect to one another.

Any reducing agents known in the art can be utilized to achieve the purpose of the present invention. Preferably, the reducing agent is sodium alkoxide. Even more preferably, the reducing agent is a member selected from sodium ethoxide, sodium methoxide, and mixtures thereof.

Likewise, a variety of solvents known in the art can be utilized for the purpose of the present invention. Preferably, the solvent to be employed is an alcohol. Even more preferably, the solvent is a member selected from ethanol, propanol, ethylene glycol, and mixtures thereof.

The dissolution of the platinum precursors and reducing agent in the solvent should yield a clear solution, to which a carbon support is added. In preferred embodiments of the invention, the mass ratio of platinum precursors to carbon support ranges from about 1:9 to about 9:1. In this manner, the carbon support would be loaded with about 10% to about 90% by weight of platinum. The solution to which carbon support has been added is mixed at speeds in access of about 100 rpm, then subjected to ultrasonic treatment at about 30-60 Hz thereby forming a colloidal slurry.

If the ratio of platinum precursors to carbon support falls below about 1:9, the ratio of carbon to platinum becomes comparatively too great such that a thicker electrode will be produced from the catalyst thus formed and increased resistance against material delivery would result. Meanwhile, a weight ratio exceeding 9:1 would result in a catalyst with non-uniformly sized platinum particles.

If the mixing speed falls below 100 rpm, it becomes difficult to achieve even mixing of the solution. As one of ordinary skill in the art will recognize, any mixing mechanism can be employed to achieve the purpose of the present invention.

After undergoing ultrasonic treatment, platinum chloride is reduced to platinum by heat treatment, i.e. subjecting the mixture to temperatures ranging from about 5° C.-80° C. Using temperatures below 5° C. would take much longer time to achieve the reduction of platinum ions. In contrast, using temperatures in excess of about 80° C. may cause the solvent to boil over and evaporate and result in non-uniformly sized particles. In preferred embodiments, the heat treatment is performed for about 15-20 h at 5° C. and for about 3-5 h at 80° C.

After the heat treatment, 0.1-0.5 M HCl solution is added to the mixture and agitated for about 2 h. After agitation, the composition undergoes filtration to remove precipitates therefrom and the resultant catalyst washed with distilled water to produce a highly dispersed supported platinum catalyst.

The following examples are provided by way of illustration only and not to be construed as a limitation to the invention. Those of skill in the art will readily recognize a variety of non-critical parameters that could be changed or modified to yield essentially similar results.

EXAMPLES

Example

Sodium ethoxide (0.416 g) was dissolved in 20 mL of ethanol, then combined with platinum chloride (0.333 g) and agitated until it became clear. The resulting mixture was then added to a carbon support slurry which was dispersed in 10 mL of ethanol and further agitated to produce a platinum precursor-carbon-sodium ethoxide ethanol mixture.

Said mixture is subjected to ultrasonic treatment for 10 min, then agitated for 4 h at 70° C., then combined with 30 mL of 0.2 M HCl solution and agitated for 3 h. The composition was then filtered to remove precipitates therefrom and subsequently washed with distilled water.

Comparative Example 1

Experiment was performed with the same parameters as in Example except that distilled water was used instead of a HCl solution.

Comparative Example 2

Experiment was performed with the same parameters as in Example except that sodium hydroxide was used instead of a HCl solution.

Comparative Example 3

Experiment was performed with the same parameters as in Example except that sodium nitrate was used instead of a HCl solution.

Comparative Example 4

Experiment was performed using Alfa Aesar catalyst purchased from Johnson-Matthey (40% impregnated catalyst).

Comparative Example 5

Experiment was performed using 60% Pt on Vulcan XC-72 by E-TEK and 80% Pt on Vulcan XC-72 of E-TEK.

Experimental Example 1

To impregnate platinum particles onto a carbon support, there were added distilled water, HCl solution, sodium hydroxide, and sodium nitrate. As shown in FIG. 1, it is clear that the carbon support is precipitated only when a HCl solution was added.

Experimental Example 2

Figure 1A:
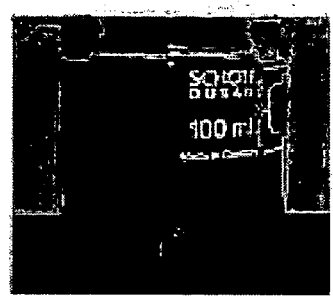
FIG. 1A shows a picture of a Pt-C-EtOH mixture obtained in the step of heat treatment wherein distilled water is added thereto.
Figure 1B:
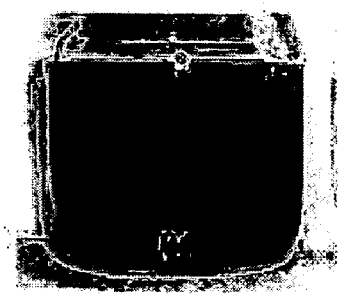
FIG. 1B shows a picture of a Pt-C-EtOH mixture obtained in the step of heat treatment wherein diluted sodium nitrate is added thereto.
Figure 1C:
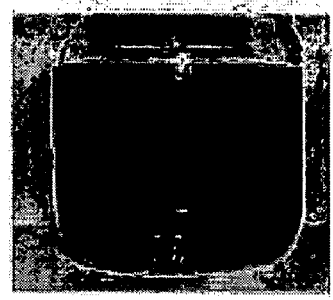
FIG. 1C shows a picture of a Pt-C-EtOH mixture obtained in the step of heat treatment wherein diluted sodium hydrate is added thereto.
Figure 1D:
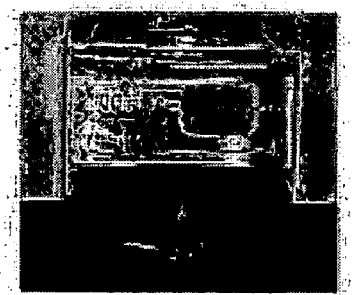
FIG. 1D shows a picture of a Pt-C-EtOH mixture obtained in the step of heat treatment wherein diluted HCl solution is added thereto.
Figure 2:
FIG. 2 is a TEM (transmission electron microscopy) image of a 40% by weight Pt/C catalyst obtained after removal of precipitates as shown in FIG. 1D and subsequent washing.

FIG. 2 shows an image of precipitates of FIG. 1D using TEM (transmission electron microscopy) after filtration and washing of the precipitates. From the image, it is shown that fine platinum particles are uniformly dispersed on the carbon support.

Experimental Example 3

Figure 3:
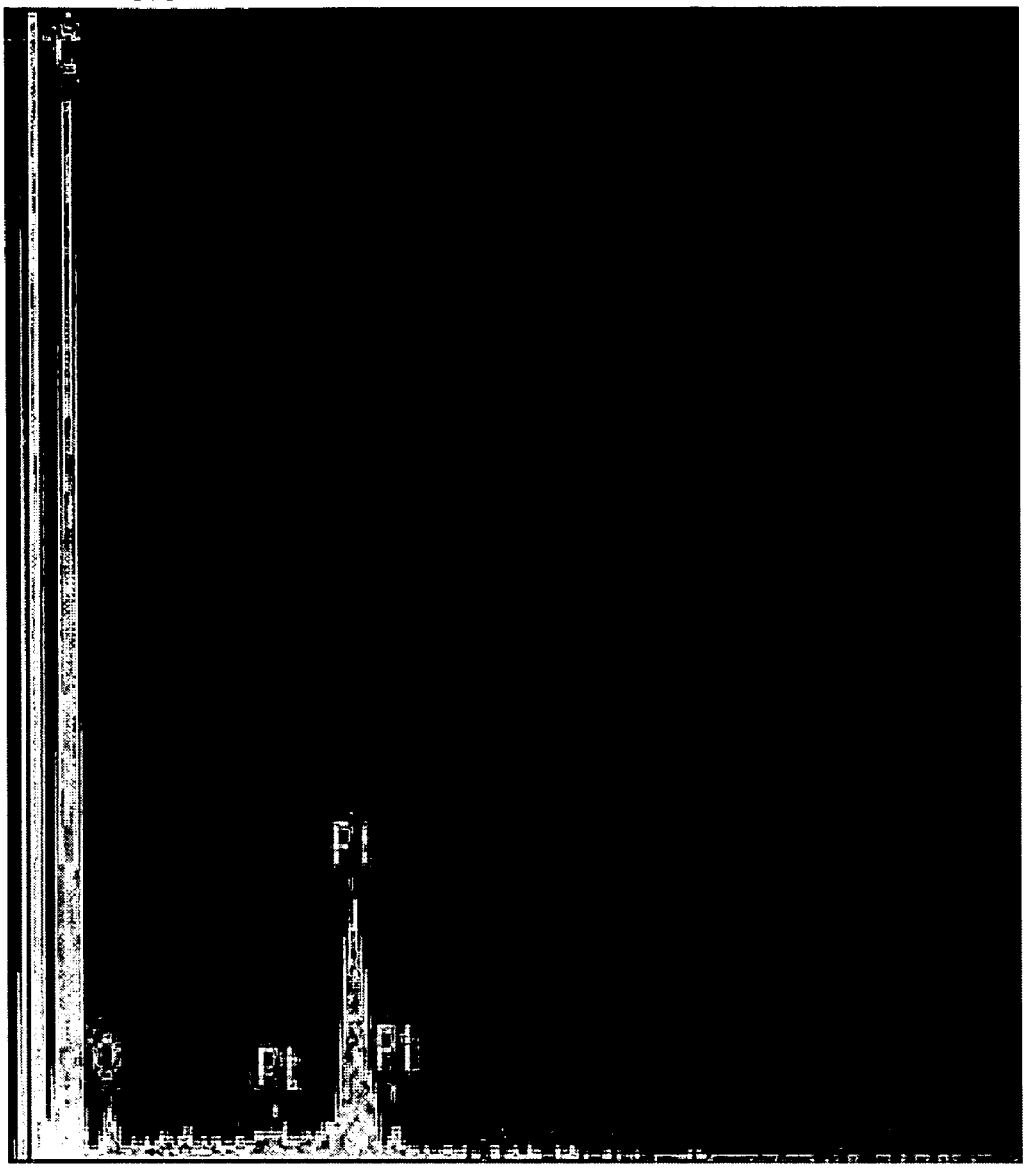
FIG. 3 shows results of a quantitative analysis of Pt-impregnated catalyst by energy dispersion x-ray spectroscopy.

FIG. 3 shows the results of quantitative analysis of platinum-impregnated catalyst by energy dispersion x-ray spectroscopy, revealing that 39.5% by weight of platinum was impregnated onto the carbon support.

Experimental Example 4

FIG. 4 is a comparison of various % by weight of Pt-impregnated catalysts (Pt-ETX) synthesized according to the present invention with conventional commercial catalysts (Pt-Commercials) based on θ-2 θ x-ray diffraction profiles.

The size of platinum particles dispersed onto a carbon support was measured by means of a peak width (220) on an X-ray diffraction (XRD) curve. To explain, the area of platinum surface was calculated based on the assumption that the platinum particles are spherical. Results of the experiment are shown in Table 1 as follows. In this experiment, the platinum FCC (face-centered cubic) structure of the various catalysts was identified by XRD and the size of the platinum particles was estimated by the equation below.

$$D = \frac{0.9\lambda}{B\cos\theta}$$

wherein

D—Crystallite size

λ—X-ray wave length

B—FWHM (Full Width Half Maximum) value

θ—(220) peak position.

TABLE 1

| Category | Platinum Impregnation (% by weight) | Size of platinum particle (nm) | Surface area of platinum (m²/g) |
|---|---|---|---|
| Ex. | 40 | 2.12 | 132 |
|  | 60 | 2.41 | 116 |
|  | 80 | 3.03 | 92 |
| Comp. Ex. 1 | carbon support not precipitated | | |
| Comp. Ex. 2 | carbon support not precipitated | | |
| Comp. Ex. 3 | carbon support not precipitated | | |
| Comp. Ex. 4 | 40 | 3.64 | 77 |
| Comp. Ex. 5 | 60 | 4.59 | 61 |
|  | 80 | 5.20 | 54 |

From Table 1, it is clear that the catalysts synthesized according to the present invention had smaller particle size than those of commercial ones with the same % by weight of Pt. In summary, the platinum particular size, i.e. diameter, of catalysts prepared according to the invention is about 52.5%-58.2% that of conventional catalysts with a corresponding increase in surface area of about 170%-190%.

Experimental Example 5

The catalytic activities of 60% by weight platinum catalyst synthesized according to the present invention are compared with those of commercially available ones (20% Pt on Vulcan XC-72, E-TEK) by measuring the degree of dispersion.

The change in current through an electrolytic solution containing 0.5 M sulfuric acid when a certain voltage is applied at regular intervals was measured and inputted into the following equation 1.

$$S_{electro} = \frac{Q \times 10}{vcL_{pt}} \quad (1)$$

In equation (1), $S_{electro}$ is the degree of dispersion of a catalyst as measured by an electrochemical technique; Q is the quantity of electric charge; V refers to the voltage applied per second (mV/sec); c is a constant calculated with platinum impregnated carbon catalyst particles applied to a working electrode. into the working electrode in a single layer; and $L_{pt}$ is the amount of impregnated platinum in units of $mg_{Pt}$/cm. In this example, the measurements were obtained using cyclic voltammetry and the c constant was obtained with a catalyst ink that is well dispersed onto a working electrode at the time of obtaining measurements of the electrochemically active surface area.

Therefore, the actual degree of dispersion of a catalyst varies with the value of $S_{electro}$ as shown in FIG. 4. The value of $S_{electro}$ obtained from catalysts produced by the present invention was 123.8 $m^2$/g whereas that of the commercially available catalysts was 52.9 $m^2$/g. Therefore, the platinum catalyst synthesized according to the present invention is expected to have about 230% improvement in catalytic activity over its commercially available counterparts.

INDUSTRIAL APPLICABILITY

As stated above, the method of synthesizing highly dispersed supported platinum catalyst of the present invention enables production of a uniformly and highly dispersed supported platinum catalyst as compared to conventional methods. The method of manufacturing a catalyst developed in the present invention requires a relatively low reaction temperature and is not sensitive to variations in reaction conditions. As such, greater uniformity in size and dispersion of platinum particles can be achieved with the present invention than with conventional colloidal methods and the present method is also better adapted to application in large-scale manufacturing.

Further, the highly dispersed supported platinum catalyst of the present invention can be used in low temperature type fuel cells and thereby enhance the capability of the fuel cells in which they are employed.

Those of ordinary skill in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth herein.

The invention claimed is:

1. A method of synthesizing highly dispersed supported platinum catalyst comprising:
    (a) dissolving sodium alkoxide and platinum chloride in a solvent to produce a solution;
    (b) mixing the solution with a carbon support;
    (c) subjecting the solution mixed with the carbon support to ultrasonic treatment at about 30-60 Hz;
    (d) heating the solution mixed with the carbon support to temperatures ranging from about 5° C.-80° C.;
    (e) combining the solution mixed with the carbon support with a HCl solution;
    (f) optionally, filtering out the precipitates from the solution of step (a) to synthesize said catalyst; and
    (g) optionally, washing the catalyst with water,
wherein the molar ratio of platinum chloride:sodium alkoxide ranges from about 1:4 to 1:8.

2. The method of claim 1, wherein said solvent is an alcohol.

3. The method of claim 1, wherein the ratio of platinum chloride:carbon support ranges from about 1:9 to about 8:2.

4. A method of synthesizing highly dispersed supported platinum catalyst comprising:
    (a) dissolving sodium alkoxide and platinum chloride in a solvent to produce a solution;
    (b) mixing the solution with a carbon support;
    (c) subjecting the solution mixed with the carbon support to ultrasonic treatment at about 30-60 Hz;
    (d) heating the solution mixed with the carbon support to temperatures ranging from about 5° C.-80° C.;
    (e) combining the solution mixed the carbon support with a HCl solution;
    (f) optionally, filtering out the precipitates from the solution of step (a) to synthesize a catalyst; and
    (g) optionally, washing the catalyst with water,
wherein the molar ratio of platinum chloride:sodium alkoxide ranges from about 1:4 to 1:8 and step (e) occurs after steps (a) through (d).

5. The method of claim 4, wherein said solvent is alcohol.

6. The method of claim 4, wherein the ratio of platinum chloride:carbon support ranges from about 1:9 to about 8:2.

* * * * *